United States Patent [19]

Balzer

[11] Patent Number: 4,842,067
[45] Date of Patent: Jun. 27, 1989

[54] PROCESS FOR ENHANCED RECOVERY OF OIL FROM A SUBSURFACE RESERVOIR FOR SURFACTANT FLOODING

[75] Inventor: Dieter Balzer, Haltern, Fed. Rep. of Germany

[73] Assignee: Huels Aktiengesellschaft, Marl, Fed. Rep. of Germany

[21] Appl. No.: 137,030

[22] Filed: Dec. 23, 1987

[30] Foreign Application Priority Data

Dec. 24, 1986 [DE] Fed. Rep. of Germany ....... 3644385

[51] Int. Cl.$^4$ .............................................. E21B 43/22
[52] U.S. Cl. .................................... 166/274; 166/275; 252/8.554
[58] Field of Search ............................... 166/273, 275; 252/8.554

[56] References Cited

U.S. PATENT DOCUMENTS

| | | | |
|---|---|---|---|
| 3,348,611 | 10/1967 | Reisberg | 166/274 X |
| 3,500,919 | 3/1970 | Holm | 166/273 |
| 3,502,147 | 3/1970 | Hill et al. | 166/274 |
| 3,861,466 | 1/1975 | Gale | 166/273 |
| 4,022,699 | 5/1977 | Holm | 166/275 X |
| 4,238,331 | 12/1980 | Mitchell et al. | 166/275 X |
| 4,446,036 | 5/1984 | Hsieh et al. | 166/273 X |
| 4,542,790 | 9/1985 | Balzer | 166/273 X |
| 4,620,595 | 11/1986 | Schutt | 166/275 |

Primary Examiner—George A. Suchfield
Attorney, Agent, or Firm—Millen, White & Zelano

[57] ABSTRACT

A process for enhanced oil recovery from a subsurface reservoir by surfactant flooding useful for surfactant flooding in reservoirs with great temperature fluctuations or a temperature gradient where surfactants soluble in themselves and effective for oil mobilization do not retain such properties over wide temperature ranges of, e.g., 10° to 100° C. The new process now provides good surfactant effectiveness even at such extreme temporary and/or local temperature fluctuations as between 10° and 100° C. In the process, a mixture of a more readily soluble and a slightly soluble sulfonate is used. The solubilities may be defined in terms of the amount of a cosurfactant necessary for production of a 4% by weight sulfonate solution in synthetic seawater. Such sulfonates include, respectively, (a) a sulfonate of higher solubility, a 4% by weight solution of which can be produced by addition of, by weight, 3–11% of butylglycol or 2–8% of butyldiglycol at room temperature in synthetic seawater; and (b) a sulfonate of lesser solubility, a 4% by weight solution of which can be produced by addition of a minimum of, by weight, 20–60% of butylglycol, or 16–40% of butyl diglycol at room temperature in synthetic seawater.

17 Claims, No Drawings

PROCESS FOR ENHANCED RECOVERY OF OIL FROM A SUBSURFACE RESERVOIR FOR SURFACTANT FLOODING

BACKGROUND OF THE INVENTION

In the recovery of oil from a rock reservoir generally only a fraction of the oil originally present is successfully extracted by primary recovery processes. In this case the oil reaches the surface as a result of the natural reservoir pressure. In secondary oil recovery, water is usually injected into one or more injection wells in the formation and the oil is driven to one or more production wells and then brought to the surface. This so-called water flooding as a secondary measure is relatively inexpensive and consequently is often used but in many cases leads to only a slight additional removal of oil from the reservoir.

An effective displacement of the oil, which is more expensive but in view of the future oil shortage is economically necessary, is successful by tertiary measures. This means processes in which either the viscosity of the oil is lowered and/or the viscosity of the reflooding water is increased and/or the interfacial tension between water and oil is lowered.

Most of these processes can be classified either as solution or mixture flooding, thermal oil recovery processes, surfactant or polymer flooding or as a combination of several of said processes.

Thermal recovery processes comprise the injection of steam or hot water or they occur as subsurface combustion. Solution or mixture processes involve the injection of a solvent for the oil into the reservoir, which solvent can be a gas and/or a liquid.

In surfactant processes a distinction is made, depending on the surfactant concentration, surfactant type and additives, between surfactant-supported water flooding (a process, which can serve, e.g., to increase the injectivity of injection wells or represent a "low-tension process"), micellar flooding and emulsion flooding. The surfactant process is based in the first place on a marked lowering of the interfacial tension between oil and flood water. In addition, the wettability of the rock surface and mobility ratio are very important. Favorable mobility ratios between oil and water are achieved by polymers.

This invention relates to a process for recovery of oil by surfactant flooding or micellar-polymer flooding in medium to high saline reservoirs.

The invention particularly relates to a process for reservoirs, which are governed by marked temperature fluctuations or a temperature gradient.

Since the temperature of the reservoir rock is basically determined by heat flow from the interior of the earth to the surface area, inconstant temperatures are caused either by sharp reservoir slopes or on an intervention in natural events. This intervention also occurs, e.g., the injection of water during water flooding. Long-lasting water flooding, especially of high-temperature reservoirs, often leads to the formation of a marked temperature gradient. This is particularly pronounced in the case of high-temperature offshore reservoirs, which are flooded with cold seawater, which leads to a marked cooling around the injection areas. Thus, e.g., in reservoirs in the North Sea area temperature spreads between about 10° C. close to the injection sondes and about 100° C. in more distant areas are known. A surfactant flooding process is, of course, ideally optimally effective in the entire temperature range. This ideal obviously assumes that the surfactant is stable for a long period under reservoir conditions.

Another problem of surfactant flooding is that many suitable surfactants, such as, e.g., alkyl or alkylaryl sulfonates, generally have a low tolerance limit in regard to the salinity of the reservoir water. The sensitivity of these surfactants to alkaline-earth ions is particularly pronounced. Many reservoir waters have high salinities; a very significant part of the North American light oil reservoirs have salinities around 100,000 ppm and higher, and the content of dissolved alkaline-earth ions in most cases is considerable. Also, the seawater often injected for secondary measures in offshore reservoirs has, with a TDS value of about 36,000 ppm and alkaline-earth ions of about 2,000 ppm, a salinity far above the compatibility limit for the usual sulfonates.

Typical surfactants, which are tolerant toward extremely high total salinities and corresponding alkaline-earth ion concentrations and can mobilize oil in a highly effective way, are, e.g., carboxymethylated oxethylates (cf. U.S. Pat. Nos. 4,478,281, 4,457,373 and 4,582,138). But these surfactants must be tailored for the conditions of the respective reservoir (salinity, oil character, temperature, etc.). Relatively insignificant deviations of the local reservoir temperature from a mean value has no marked influence on the surfactant activity. But marked temperature gradients with temperature spreads between 10° to 100° C. drastically impair surfactant effect.

On the other hand, if carboxymethylated oxethylates are combined with relatively hydrophobic alkyl, alkylaryl or dialkylaryl sulfonates, surfactant systems are obtained, which in the presence of suitable cosolvents can be effective in mobilizing oil over broad temperature ranges, e.g., between 10° and 100° C. This recently observed property can be understood to a certain extent, if the solubilities of the two surfactant groups are considered as a function of the temperature. The corresponding coefficients behave in a predominantly inverted manner, so that the surfactant activity is balanced to a certain extent over broad temperature ranges, as interfacial measurements as a function of temperature have shown in the meantime.

SUMMARY OF THE INVENTION

It is an object of the invention to provide a process for oil recovery using surfactant flooding of oil reservoirs, wherein in said process the surfactant effect is relatively independent of reservoir temperature. It is further an object to provide such a process wherein the surfactant effect is maintained at the high salinities often encountered in reservoirs.

Upon further study of the specification and appended claims, further objects and advantages of this invention will become apparent to those skilled in the art.

It has been observed in a completely surprising way that surfactant flooding of oil reservoirs can be attained economically even with very pronounced reservoir temperature gradients, by a process for enhanced recovery of oil from a subsurface reservoir, which reservoir is penetrated by at least one injection well and one production well, by injecting a solution or dispersion of a mixture of at least 2 sulfonates of differing solubility. The sulfonate solubility differs inasmuch as a 4% solution by weight can be produced precisely from the more readily soluble sulfonate by addition of 3 to 11% by weight of butyl glycol or 2 to 8% by weight of butyl diglycol at room temperature in synthetic seawater, while a 4% solution by weight can be produced precisely from the sulfonate of lower solubility only by addition of 20 to 60% by weight of butyl glycol or 16 to 40% by weight of butyl diglycol at room temperature in synthetic seawater.

The objects of the invention ar therefore satisfied by the provision of a process for enhanced oil recovery from a subsurface reservoir, which is penetrated by at least one injection well and at least one production well, said process comprising injecting at said injection well a solution or dispersion of at least one surfactant and a drive fluid, and recovering said oil at said production well, the improvement comprising using as the surfactant a mixture of two sulfonates having differing solubility:

(a) a sulfonate of greater solubility wherein a 4% by weight solution of sulfonate can be produced by addition of, by weight, 3–11% of butylglycol or 2–8% of butyl diglycol at room temperature in synthetic seawater;

(b) a sulfonate of lesser solubility wherein a 4% by weight solution of sulfonate is produced by adding a minimum of, by weight, 20–60% of butyl glycol, or 16–40% of butyl diglycol at room temperature in synthetic seawater.

A prerequisite for the effectiveness of the sulfonate mixture is the solubility of the two sulfonates which must be equidirectional but very different in regard to variation with temperature in the respective reservoir water in the presence of the optional cosolvent (cosurfactant).

The more readily soluble surfactant may be a monoalkylbenzene sulfonate with 5 to 13 carbon atoms in the alkyl chain, a di- or tri-alkylbenzene sulfonate with 1 to 10 carbon atoms in the alkyl chains, the total number of carbon atoms in the alkyl chains per molecule being 5 to 11, or an alkane sulfonate with 8 to 18 carbon atoms. The alkyl chains may be linear or branched.

The sulfonate of lower solubility may be a monoalkylbenzene sulfonate with 14 to 20 carbon atoms in the alkyl chain, a di- or oligo-alkylbenzene sulfonate with 1 to 20 carbon atoms per alkyl chain, the total number of carbon atoms in the alkyl chains being 12 to 30, a petroleum sulfonate or an alkane sulfonate with 19 to 26 C atoms. The alkyl chains may be linear or branched. The surfactant solution or dispersion to be injected preferably has a concentration of about 0.1 to 20% of both sulfonates.

The slug size of the surfactant-containing liquid is preferably about 0.01 to 2 pore volumes (PV).

The weight ratio of the more readily soluble sulfonate to the slightly soluble sulfonate is preferably 6:1 to 1:3, preferably 5:1 to 1:3.

After the injection of the surfactant slug, preferably formation or flood water is injected into the reservoir, and the formation or flood water suitably contains a water-soluble polymer that increases viscosity of the water injected.

Preferably a cosurfactant is added to the surfactant mixture in a weight ratio of 1:5 to 5:1, most preferably 1:4 to 4:1, with respect to the surfactant amount.

Monohydric or polyhydric alcohols or alkyl ethers of polyhydric alcohols are used as cosurfactants.

Thus, according to the invention more readily soluble sulfonates, i.e., soluble in the water of the respective reservoir in the presence of comparatively small amounts of cosurfactant, are used in mixture with a sulfonate, the sulfonate of lower solubility, largely insoluble in the respective reservoir water-cosurfactant mixture (preferable solubility limit about 1000 ppm). The necessary amounts of the cosurfactant to be used here for the solution of the more readily soluble sulfonate depend, of course, on the type of cosurfactant. As an example, amounts for a monoalkyl ether of glycol or diglycol are shown in the following table.

| Sulfonate | Amounts of cosurfactant (% by weight, in relation to the total mixture of sulfonate, seawater and glycol ether) for the production of a 4% sulfonate solution in synthetic seawater | | | |
|---|---|---|---|---|
| | Ethyl glycol | i-propyl glycol | butyl glycol | butyl diglycol |
| more readily soluble | 10–12 | 6–11 | 3–11 | 2–8 |
| of lower solubility | 20–60 | 20–50 | 20–60 | 16–40 |

Therefore, the more readily soluble sulfonate and the sulfonate of lower solubility, whose mixtures are used according to the invention, are considered to be defined by the above-mentioned table.

The composition of the synthetic seawater is as defined below.

The more readily soluble sulfonate can be a monoalkylbenzene sulfonate with 5 to 13, preferably 7 to 12, carbon atoms in the alkyl chain, a di- or tri-alkylbenzene sulfonate with 1 to 10, preferably 3 to 10, carbon atoms in the alkyl chains (the total number of C atoms in the alkyl chains per molecule being 5 to 11, preferably 6 to 11) or an alkane sulfonate with 8 to 18 C atoms.

Mixtures of mono- and/or di- and/or oligo-alkylbenzene sulfonates can also be used. Such sulfonates can be produced by alkylation of benzene, e.g., with linear or branched olefins, in the presence of suitable alkylation catalysts, followed by sulfonation. Also suitable as more readily soluble sulfonates are alkane sulfonates with 8 to 18, preferably 10 to 17, C atoms, which can be produced, e.g., by sulfoxidation of paraffins.

Suitable sulfonates of lower solubilities are monoalkylbenzene sulfonates with 14 to 20, preferably 14 to 18, C atoms in the optionally branched alkyl chain, or di- or oligo-alkylbenzene sulfonates with 1 to 20 C atoms per optionally branched alkyl chain, and the total number of C atoms in the alkyl chains per molecule is 12 to 30, preferably 14 to 24. Mixtures of mono- and/or di- and/or oligo-alkylbenzene sulfonates can also be used. Such sulfonates can be produced by alkylation of benzene, as described above.

Also suitable as sulfonates of lower solubility are alkane sulfonates with 19 to 26, preferably 19 to 24, C atoms, which can be produced, e.g., by sulfoxidation of paraffins. Petroleum sulfonates recovered from the oil layer of the reservoir are also suitable.

Preparations of the sulfonates are disclosed in, e.g. E. A. Knaggs et al. SPE-Paper 6006. Suitable sulfonates are also commercially available, e.g. from Amoco, Chicago, Ill. or Stepan Chemical Co., Maywood, N.J.

Suitable alkyl groups throughout the foregoing include, as appropriate, methyl, ethyl, n-propyl, iso-propyl, n-, sec-, iso- or t-butyl and all isomers of pentyl, hexyl, heptyl, actyl, nonyl, decyl, undecyl, dodecyl, tridecyl, tetradecyl, pentadecyl, hexadecyl, heptadecyl, octadecyl, nonadecyl and eicosyl.

In many tests it has been shown that the addition of cosurfactants is advantageous. In some cases, especially in the presence of reservoir waters with higher contents of alkaline-earth ions, the use of cosurfactants is strongly preferred. Suitable cosurfactants are monohydric alcohols with 3 to 7 C atoms, as, e.g., propanol isomers, butanol isomers, pentanol isomers, hexanol isomers, etc., or polyhydric alcohols with 3 to 10, preferably 3 to 7 C atoms, such as propanediol, butanediol, pentanediol, hexanediol, octanediol, etc. Mixtures of the two types of cosurfactant any proportions are also suitable. The alkyl ethers of polyhydric alcohols with 2 to 8 C atoms, such as ethylene glycol monoethyl ether, ethylene glycol monoisopropyl ether, ethylene glycol monobutyl ether, diethylene glycol monobutyl ether, etc. are especially preferred.

The surfactant or surfactant-cosurfactant mixtures according to the invention are preferably matched to the conditions of the respective reservoir system. In this case, the components of the reservoir water are important considerations. If this water is not reinjected, the composition of the flood water is also important. In addition, important factors include the character of the reservoir oil, the temperature or temperature range of the reservoir, and optionally the composition of the gas phase and the reservoir pressure. Preliminary tests on matching the surfactant system to the reservoir conditions are phase studies, known in the literature, for instance, in the sense of a phase volume diagram (cf. H. Kraft, G. Pusch, SPE/DOE Paper 10714), in which the volumes of the upper, middle and lower phases are determined as a function of the temperature the surfactant concentration and the oil-water ratio on a mixture of reservoir oil, reservoir water or flood water and surfactant or surfactant/cosurfactant. A surfactant or surfactant/cosurfactant combination is desirable which leads to a phase behavior, largely independent of temperature with pronounced formation of a middle-phase microemulsion. These criteria are known to one of ordinary skill in the art and matching the surfactant system to the reservoir is a matter of routine experimentation. However, such optimizing tests are preferably accompanied by additional tests. Thus studies on the decane/seawater system in the presence of alkyl benzene sulfonate/nonylphenoloxethylatene/i-butanol did show the desired phase behavior, largely independent of temperature, but not the oil removal investigated in flood tests parallel thereto. Further preferably preliminary tests for matching the surfactant system to the reservoir, which directly show its effectiveness, therefore are linear displacement tests on model formations of sandstone or sand, so-called flood tests, as described in the examples. As distinguished from the phase studies, in which state of equilibrium barely achieved during the surfactant flooding is observed, the displacement tests consider the unbalancing processes really taking place in the reservoir as well as the surfactant retention. These tests are also wholly conventional, e.g., is disclosed in U.S. Pat. No. 4,478,281. Additional details are provided in the examples.

Flood tests as much as possible on original core material and, if necessary, under reservoir conditions, enable laboratory optimization of the surfactant/cosurfactant system with respect to the liquid form of the active substance (solution, dispersion or emulsion), its concentration and its volume, moreover with respect to the type, concentration and volume of the polymer solution to be used as mobility buffer.

On the basis of preliminary tests, a surfactant solution or dispersion is introduced into the reservoir by injection pumps. This takes place in the form of slugs, i.e., of limited volumes preferably of 0.01 to 2 PV (=pore volume of the reservoir), more preferably 0.02 to 1.2 PV.

The size of the surfactant slug depends on the surfactant concentration and the economic effiency. Usually, the surfactant concentration is between 0.1 and 20%, preferably between 0.2 and 10%. Only sulfonates are considered this surfactant concentration. The ratio of the masses of the more readily soluble sulfonate to those of the sulfonate of lower solubility is 6:1 to 1:3, preferably 5:1 to 1:2.

If a cosurfactant is used, the ratio of its mass to that of the surfactant mixture should be 1:5 to 5:1, preferably 1:4 to 4:1, more preferably 1:3 to 3:1.

Before injection of the surfactant liquid, flooding with water is suitably performed, and preferably the produced formation water is used as flood water. In special cases, it can be useful to perform flooding with a water of a composition different from that of the formation water. This is desirable where necessary to adjust the reservoir to a specific salinity in order to establish III-phase-behavior (middle-phase micro emulsion) of the surfactant-cosolvent-crudeoil-brine system. The size of the flood water slug is 0.01 to 4 PV, preferably 0.1 to 2 PV.

Both because of mobility control—as mentioned—and also to protect the surfactant liquids from penetrating flood water, polymer solution can be injected into the reservoir after the last surfactant liquid. For this purpose, a polymer or a polymer mixture is dissolved in such a concentration in the flood water that the viscosity is 1.2- to 10-fold higher than that of the oil under reservoir conditions. These polymers are conventional and commercially available. Biopolymers such as, for example, xanthan gum, or cellulose derivatives and polyacrylamides are suitable as polymers, which in the presence of the preset salinity still have a sufficient viscosity and show no precipitations. The slug size of the polymer is 0.1 to 4 PV, preferably 0.2 to 2 PV. Suitably normal water flooding follows the injection of the polymer solution as drive fluid for oil recovery. This is continued as long as oil can be recovered economically.

EXAMPLES

Without further elaboration, it is believed that one skilled in the art can, using the preceding description; utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire text of all applications, patents and publications, if any, cited above and below are hereby incorporated by reference.

The following examples are linear displacement tests either on sand beddings or on sandstone cores as laboratory model formations.

For the production of a sand bedding a thermostatable steel pipe 140 cm long and 5 cm in diameter was provided with a temperature measuring device and pressure gage, lockable on both sides with screw locks with capillary intake and pressure holding valve outlet, charged with quartz sand with rounded edges. Then the sand bedding was wetted with salt water by means of a diaphragm pump and brought to the desired temperature by a thermostat. The permeability of the bedding was determined by pressure transmitters. Then saturation was produced with a model oil (n-decane or crude oil), and at the same time the retained water content could be determined. Then 1.5 PV (1 PV being about 1400 ml) of salt water was injected at a rate of about 1 m/d, and a degree of dilution of 98 to 100% occurred.

After this water flooding, first the surfactant mixture and then the polymer solution, both as a slug, were injected. More salt water was injected as the drive fluid.

Cylindrical cores of Bentheim sandstone 50 cm long and 8 cm in diameter were embedded in epoxy resin for production of model formations from consolidated rock. The pore volumes were about 600 ml, the flooding rate about 0.5 m/d. Temperature regulation in the cores embedded in the resin took place by means of an open temperature bath. Otherwise there were no differences in the operation of these model formations in comparison with that on sand beddings. In all displacement tests, after injection of 0.3 PV of a surfactant system, 0.6 PV of a 0.2% solution of Polymer Flocon 4800 (xanthan, Pfizer) in the relevant salt water was injected into the formation.

EXAMPLES 1 TO 10

The examples according to the invention are represented in the following table. The following substances were used:

Oil:
D n-decane 96%
N 35° API crude oil
  61% paraffinic, 16% napthenic, 23% aromatic hydrocarbons
  $\eta_{20°C.}$ 6 mPa s Salt water:
S synthetic seawater
  1.12% $Na^+$, 0.035% $K^+$, 0.047% $Ca^{++}$, 0.133% $Mg^{++}$, 2.03% $Cl^-$, 0.27% $SO_4^{2-}$
T synthetic formation water
  1.51% $Na^+$, 0.035% $K^+$, 0.047% $Ca^{++}$, 0.133% $Mg^{++}$, 2.64% $Cl^-$, 0.27% $SO_4^{2-}$ readily soluble sulfonates:
  $a_1$ ($C_{10}$–$C_{13}$)-n-alkylbenzene sulfonate (MARLON$^R$ A, Huels AG)
  $a_2$ ($C_{14}$–$C_{17}$) sec-paraffin sulfonate (MARLONR PS 60)

sulfonate of lower solubilities:
  $b_1$ i-octyl-butyl benzenesulfonate active substance 52%, neutral oil 0.1%
  $b_2$ i-octyl-butyl benzenesulfonate/i-dodecyl-butyl benzenesulfonate 1:1 active substance 49%, neutral oil 3%
  $b_3$ i-dodecyl-butyl benzenesulfonate active substance 46%, neutral oil 5.8%
  $b_4$ i-hexadecyl-butyl benzenesulfonate active substance 38% cosurfactants:
  $c_1$ ethylene glycol butyl monoether (99%)
  $c_2$ diethylene glycol butyl monoether (97%)

TABLE

| No. | Formation | permeability (D) | Oil | Salt Water | Temp. (°C.) | Sulfonates readily soluble | Sulfonates of lower solubility | Cosurfactant | DeltaE$_w$* (% OOIP) | DeltaE$_T$* (% OOIP) | Deltap** (bar/m) |
|---|---|---|---|---|---|---|---|---|---|---|---|
| 1 | core | 1.9 | D | S | 20 | $a_1$, 2% | $b_1$, 2% | $c_1$, 4% | 45 | 38 | 1.2 |
| 2 | core | 0.8 | D | S | 54 | $a_1$, 2% | $b_1$, 2% | $c_1$, 4% | 51 | 36 | 0.5 |
| 3 | sand | 1.2 | D | S | 90 | $a_1$, 2% | $b_1$, 2% | $c_2$, 4% | 80 | 17 | 0.9 |
| 4 | core | 2.4 | D | S | 20 | $a_1$, 2% | $b_1$, 2% | $c_1$, 4% | 58 | 21 | 1.0 |
| 5 | core | 2.4 | D | S | 20 | $a_1$, 2% | $b_3$, 2% | $c_2$, 4% | 52 | 37 | 1.1 |
| 6 | core | 1.8 | D | S | 50 | $a_1$, 2% | $b_3$, 2% | $c_2$, 4% | 56 | 34 | 1.3 |
| 7 | sand | 1.3 | D | S | 20 | $a_2$, 2% | $b_1$, 2% | $c_1$, 4% | 74 | 24 | 1.1 |
| 8 | sand | 1.1 | D | S | 50 | $a_2$, 2% | $b_1$, 2% | $c_1$, 4% | 80 | 18 | 1.1 |
| 9 | snad | 2.2 | D | S | 50 | $a_2$, 2% | $b_2$, 2% | $c_1$, 4% | 76 | 16 | 1.1 |
| 10 | core | 0.7 | D | T | 90 | $a_2$, 2% | $b_4$, 2% | $c_1$, 4% | 85 | 10 | 1.4 |

*DeltaE$_w$ or DeltaE$_T$ mean oil removal (% OOIP) by means of water flooding or subsequent surfactant flooding
**Deltap is the maximum pressure gradient Examples 1 to 3, 5 to 6 or 7 to 8 show that by the sulfonate mixtures to be used according to the invention a predominantly quantitative tertiary oil removal of the model formations over a broad temperature range is possible. A critically high pressure buildup was not observed in any instance. The total surfactant retention determined in some cases (examples 2, 7 and 8) showed values of about 0.2 to 0.3 mg/g of sand or sandstone, thus it is shown that in the process according to the invention only a relatively small part of the surfactant is lost by adsorption and other retention processes of the flooding process.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for enhanced oil recovery from a subsurface reservoir which is penetrated by at least one injection well and at least one production well, comprising injecting at said injection well a solution or dispersion of at least one surfactant and recovering said oil at said production well, the improvement comprising using as the surfactant a mixture of effective amounts of two sulfonates having different solubilities:

(a) a sulfonate of higher solubility, a 4% by weight solution of which is produced by addition of, by weight, 3–11% of butylglycol or 2–8 of butyldiglycol at room temperature in synthetic seawater; and (b) a sulfonate of lesser solubility, a 4% by weight solution of which is produced by addition of a minimum of, by weight, 20–60% of butylglycol, or 16–40% of butyl diglycol at room temperature in synthetic seawater.

2. A process according to claim 1, wherein the sulfonate of higher solubility is a (mono-$C_{5-13}$-alkyl)benzene sulfonate, a (di- or tri-$C_{1-10}$-alkyl)benzene sulfonate, the total number of carbon atoms in all alkyl chains per molecule being 5 to 11, $C_{8-18}$-alkyl or a sulfonate; and the sulfonate of lesser solubility is a (mono-$C_{14-20}$-alkyl)benzene sulfonate, a (di- or oligo-$C_{1-20}$-alkyl)benzene sulfonate, the total number of carbon atoms in all alkyl chains per molecule being 12 to 30, or a $C_{19-26}$-alkyl sulfonate.

3. A process according to claim 1, wherein the sulfonate of higher solubility is a (mono-$C_{7-12}$-alkyl)benzene sulfonate, a (di- or tri-$C_{3-10}$-alkyl)benzene sulfonate, the total number of carbon atoms in the alkyl chains being 6 to 11, and the sulfonate of lesser solubility is (mono-$C_{14-18}$-alkyl)benzene sulfonate, a (di- or oligo-$C_{1-20}$-alkyl)benzene sulfonate, the total number of carbon atoms in the alkyl chains per molecule being 14 to 24, or a $C_{19-24}$-alkyl sulfonate.

4. A process according to claim 1, wherein the ratio of the sulfonate of higher solubility to the sulfonate of lesser solubility is 6:1 to 1:3 by weight.

5. A process according to claim 1, wherein the ratio of the sulfonate of higher solubility to the sulfonate of lesser solubility is 5:1 to 1:2 by weight.

6. A process according to claim 1, wherein a monohydric alcohol, a polyhydric alcohol or an alkyl ether of a polyhydric alcohol is used as a cosurfactant.

7. A process according to claim 6, wherein the ratio of the cosurfactant to the surfactant mixture is 1:5 to 5:1 by weight.

8. A process according to claim 6, wherein the cosurfactant is propanol, butanol, pentanol, hexanol, propane diol, butanediol, pentanediol, hexanediol, octanediol or a mixture thereof.

9. A process according to claim 6, wherein the cosurfactant is ethylene glycol monoethyl ether, ethylene glycol monoisopropyl ether, ethylene glycol monobutyl ether or diethylene glycol monobutyl ether.

10. A process according to claim 1, wherein the surfactant solution or dispersion to be injected has a concentration of 0.1 to 20% by weight of sulfonates.

11. A process according to claim 1, wherein the surfactant solution or dispersion to be injected has a concentration of 0.2 to 10% by weight of sulfonates.

12. A process according to claim 1, wherein the surfactant-containing liquid is injected as a slug having a slug size of 0.01 to 2 pore volumes (PV).

13. A process according to claim 1, wherein the surfactant-containing liquid is injected as a slug having a slug size of 0.02 to 1.2 PV.

14. A process according to claim 12, wherein after injection of the surfactant slug, water is injected into the reservoir, said water containing a water-soluble polymer effective to raise the viscosity thereof to a value 1.2–10 times the viscosity of the oil contained in the reservoir.

15. A process according to claim 14, wherein the water is formation water.

16. A process according to claim 14, wherein the water is injected as a slug having a size of 0.01 to 4 PV.

17. A process according to claim 14, wherein the polymer is xanthan gum, a cellulose derivative or a polyacrylamide.

* * * * *